(12) United States Patent
Sueno et al.

(10) Patent No.: US 11,618,283 B2
(45) Date of Patent: Apr. 4, 2023

(54) PNEUMATIC TIRE

(71) Applicant: Sumitomo Rubber Industries, Ltd., Hyogo (JP)

(72) Inventors: Junya Sueno, Kobe (JP); Kohei Hayama, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 557 days.

(21) Appl. No.: 16/514,297

(22) Filed: Jul. 17, 2019

(65) Prior Publication Data

US 2020/0023691 A1  Jan. 23, 2020

(30) Foreign Application Priority Data

Jul. 23, 2018 (JP) .............................. JP2018-137730

(51) Int. Cl.
*B60C 9/02* (2006.01)
*B60C 15/06* (2006.01)
*B60C 15/00* (2006.01)
*B60C 3/04* (2006.01)

(52) U.S. Cl.
CPC .............. *B60C 9/0292* (2013.01); *B60C 3/04* (2013.01); *B60C 15/0054* (2013.01); *B60C 15/06* (2013.01); *B60C 15/0603* (2013.01); *B60C 2015/009* (2013.01); *B60C 2015/061* (2013.01);
(Continued)

(58) Field of Classification Search
CPC ... B60C 13/003; B60C 15/0054; B60C 15/06; B60C 1/0603; B60C 2009/0425; B60C 2015/061; B60C 2015/0614; B60C 2015/0621; B60C 9/0292; B60C 15/0603
See application file for complete search history.

(56) References Cited

U.S. PATENT DOCUMENTS

| | | | |
|---|---|---|---|
| 4,282,918 A | | 8/1981 | Tomoda et al. |
| 4,345,634 A | * | 8/1982 | Giron ........................ B60C 3/04 |
| | | | 152/454 |
| 4,708,185 A | | 11/1987 | Imai et al. |

(Continued)

FOREIGN PATENT DOCUMENTS

| | | | | |
|---|---|---|---|---|
| EP | 0298673 A2 | * | 1/1989 | ........... B60C 9/0292 |
| EP | 2072289 A1 | * | 6/2009 | ................ C08L 9/00 |

(Continued)

OTHER PUBLICATIONS

Takada, Machine Translation of JP2016068662 (Year: 2016).*
(Continued)

*Primary Examiner* — Adrienne C. Johnstone
(74) *Attorney, Agent, or Firm* — Studebaker & Brackett PC

(57) ABSTRACT

In a tire 2, a length from a center in an axial direction of a boundary between a core 30 and an apex 32 of each bead 10 to an outer end PA of the apex 32 is not less than 10 mm and not greater than 15 mm. In a state where the tire 2 is mounted on a normal rim and an internal pressure of the tire 2 is adjusted to a normal internal pressure, a shape of a main body portion 36, of a carcass ply 34, which is located in a zone from a boundary portion between a tread 4 and each sidewall 6 to the outer end PA of each apex 32 is represented by a single circular arc, and a diameter of the circular arc is not less than 75% and not greater than 90% of a cross-sectional height of a carcass 14.

15 Claims, 2 Drawing Sheets

(52) U.S. Cl.
CPC ............... *B60C 2015/0614* (2013.01); *B60C 2015/0617* (2013.01); *B60C 2015/0621* (2013.01)

(56) References Cited

U.S. PATENT DOCUMENTS

| | | | |
|---|---|---|---|
| 6,520,760 B1 * | 2/2003 | Canevini | B60C 9/0292 |
| 2014/0238569 A1 | 8/2014 | Ferigo | |
| 2017/0036490 A1 * | 2/2017 | Mun | B60C 3/04 |
| 2017/0087938 A1 * | 3/2017 | Oyama | D02G 3/48 |

FOREIGN PATENT DOCUMENTS

| | | | |
|---|---|---|---|
| EP | 3357715 A1 | | 8/2018 |
| GB | 2224703 A | | 5/1990 |
| JP | S61155005 A | | 7/1986 |
| JP | 2011148402 A | * | 8/2011 |
| JP | 2016068662 A | * | 5/2016 |
| JP | 2016068662 A | | 5/2016 |
| JP | 2017-030620 A | | 2/2017 |
| KR | 20070000757 A | * | 1/2007 |

OTHER PUBLICATIONS

English machine translation of KR 10-2007-0000757 A, Jan. 3, 2007.*
English machine translation of JP 2011-148402 A, Aug. 4, 2011.*
The extended European search report issued by the European Patent Office dated Dec. 16, 2019, which corresponds to European Patent Application No. EP 19187118.5.

* cited by examiner

PNEUMATIC TIRE

The present application is based upon and claims the benefit of priority to Japanese Patent Application No. 2018-137730, filed Jul. 23, 2018, the entire contents of which are incorporated herein by reference.

BACKGROUND OF THE INVENTION

Field of the Invention

The present invention relates to pneumatic tires.

Description of the Related Art

Each bead of a tire includes a core and an apex. A hard crosslinked rubber is used for the apex. To ensure desired stiffness, an apex having a length of about 30 mm to 40 mm is generally used.

From consideration for the environment, reduction of weight and reduction of rolling resistance are required for tires. Therefore, use of a small apex having a length of about 5 mm to 15 mm is considered.

For example, Japanese Laid-Open Patent Publication No. 2017-030620 discloses a bead including a first apex and a second apex located axially outward of the first apex. The first apex is the above-described small apex. The second apex is interposed between a carcass and a clinch at the axially outer side of the first apex. In Japanese Laid-Open Patent Publication No. 2017-030620, improvement of durability and the like is achieved by adjusting the shape of the second apex.

When a small apex is used as an apex of each bead in order to reduce the weight and the rolling resistance of a tire, reduction of stiffness of a bead portion is inevitable. When the second apex is provided between the carcass and the clinch as in Japanese Laid-Open Patent Publication No. 2017-030620, improvement of stiffness is expected. However, in this case, the effect of reducing the weight and the rolling resistance due to use of the small apex diminishes. Therefore, establishment of technology to achieve reduction of weight and rolling resistance while ensuring desired stiffness is required.

The present invention has been made in view of the above circumstances, and an object of the present invention is to provide a pneumatic tire that has a reduced weight and reduced rolling resistance while ensuring desired stiffness.

SUMMARY OF THE INVENTION

As a result of a thorough study to achieve reduction of weight and rolling resistance while ensuring desired stiffness, the present inventors have found that, when a main body portion, of a carcass ply, which is located in a zone from a boundary portion between a tread and each sidewall to the outer end of each apex has a specific shape, the main body portion can contribute to ensuring desired stiffness and reduction of weight and rolling resistance. Thus, the present inventors have completed the present invention.

A pneumatic tire according to an aspect of the present invention includes:

a pair of beads each having a core extending in a circumferential direction and an apex located radially outward of the core;

a carcass extending from one bead to the other bead at an inner side of a tread and a pair of sidewalls connected to ends of the tread;

a pair of clinches located radially inward of the sidewalls; and a pair of rubber reinforcing layers located between the carcass and the clinches.

The carcass includes a carcass ply having a main body portion that extends on and between one core and the other core and a pair of turned-up portions that are connected to the main body portion and turned up around the cores from an inner side toward an outer side in an axial direction. A length from a center in the axial direction of a boundary between the core and the apex to an outer end of the apex is not less than 10 mm and not greater than 15 mm. In a state where the tire is mounted on a normal rim and an internal pressure of the tire is adjusted to a normal internal pressure, a shape of the main body portion located in a zone from a boundary portion between the tread and each sidewall to the outer end of each apex is represented by a single circular arc, and a diameter of the circular arc is not less than 75% and not greater than 90% of a cross-sectional height of the carcass.

Preferably, in the pneumatic tire, in a state where the tire is mounted on the normal rim and the internal pressure of the tire is adjusted to 10% of the normal internal pressure, the main body portion extending along an inner surface of the apex is inclined relative to the axial direction, and an angle of the main body portion relative to the axial direction is not less than 45° and not greater than 50°.

Preferably, in the pneumatic tire, a distance in a radial direction from a bead base line to an outer end of each rubber reinforcing layer is not less than 35% and not greater than 45% of a cross-sectional height of the tire.

Preferably, in the pneumatic tire, a maximum thickness of each rubber reinforcing layer is not less than 2 mm and not greater than 4 mm.

Preferably, in the pneumatic tire, the rubber reinforcing layer has the maximum thickness at a portion thereof at the outer end of the apex.

Preferably, in the pneumatic tire, a complex elastic modulus $E^*a$ of each apex is not less than 70 MPa and not greater than 130 MPa, and a loss tangent LTa of each apex is not greater than 0.18.

Preferably, in the pneumatic tire, a complex elastic modulus $E^*c$ of each clinch is not less than 7 MPa and not greater than 13 MPa, and a loss tangent LTc of each clinch is not greater than 0.08.

Preferably, in the pneumatic tire, a distance in a radial direction from a bead base line to an end of each turned-up portion is not less than 20 mm and not greater than 30 mm.

Preferably, in the pneumatic tire, the carcass ply includes a large number of carcass cords aligned with each other, and a fineness of each carcass cord is not less than 1500 dtex and not greater than 1700 dtex.

Preferably, in the pneumatic tire, a complex elastic modulus $E^*r$ of each rubber reinforcing layer is higher than a complex elastic modulus $E^*c$ of each clinch.

Preferably, in the pneumatic tire, a loss tangent LTc of each clinch is lower than a loss tangent LTr of each rubber reinforcing layer.

Preferably, in the pneumatic tire, a complex elastic modulus $E^*r$ of each rubber reinforcing layer is equal to a complex elastic modulus $E^*a$ of each apex, or lower than the complex elastic modulus $E^*a$ of each apex.

Preferably, in the pneumatic tire, a loss tangent LTr of each rubber reinforcing layer is equal to a loss tangent LTa of each apex, or lower than the loss tangent LTa of each apex.

According to the present invention, a pneumatic tire that has a reduced weight and reduced rolling resistance while ensuring desired stiffness is obtained.

DETAILED DESCRIPTION OF THE EMBODIMENTS

The following will describe in detail the present invention based on preferred embodiments with appropriate reference to the drawings.

In the present invention, a state where the tire is mounted on a rim (normal rim), the internal pressure of the tire is adjusted to a normal internal pressure, and no load is applied to the tire is referred to as a normal state. In the present invention, unless otherwise specified, the dimensions and angles of the tire and each component of the tire are measured in the normal state.

In the present specification, the normal rim means a rim specified in a standard on which the tire is based. The "standard rim" in the JATMA standard, the "Design Rim" in the TRA standard, and the "Measuring Rim" in the ETRTO standard are normal rims.

In the present specification, the normal internal pressure means an internal pressure specified in the standard on which the tire is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures. In the case where the tire is designed for a passenger car, unless otherwise specified, the normal internal pressure is 180 kPa.

In the present specification, a normal load means a load specified in the standard on which the tire is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard are normal loads.

Figure 1:
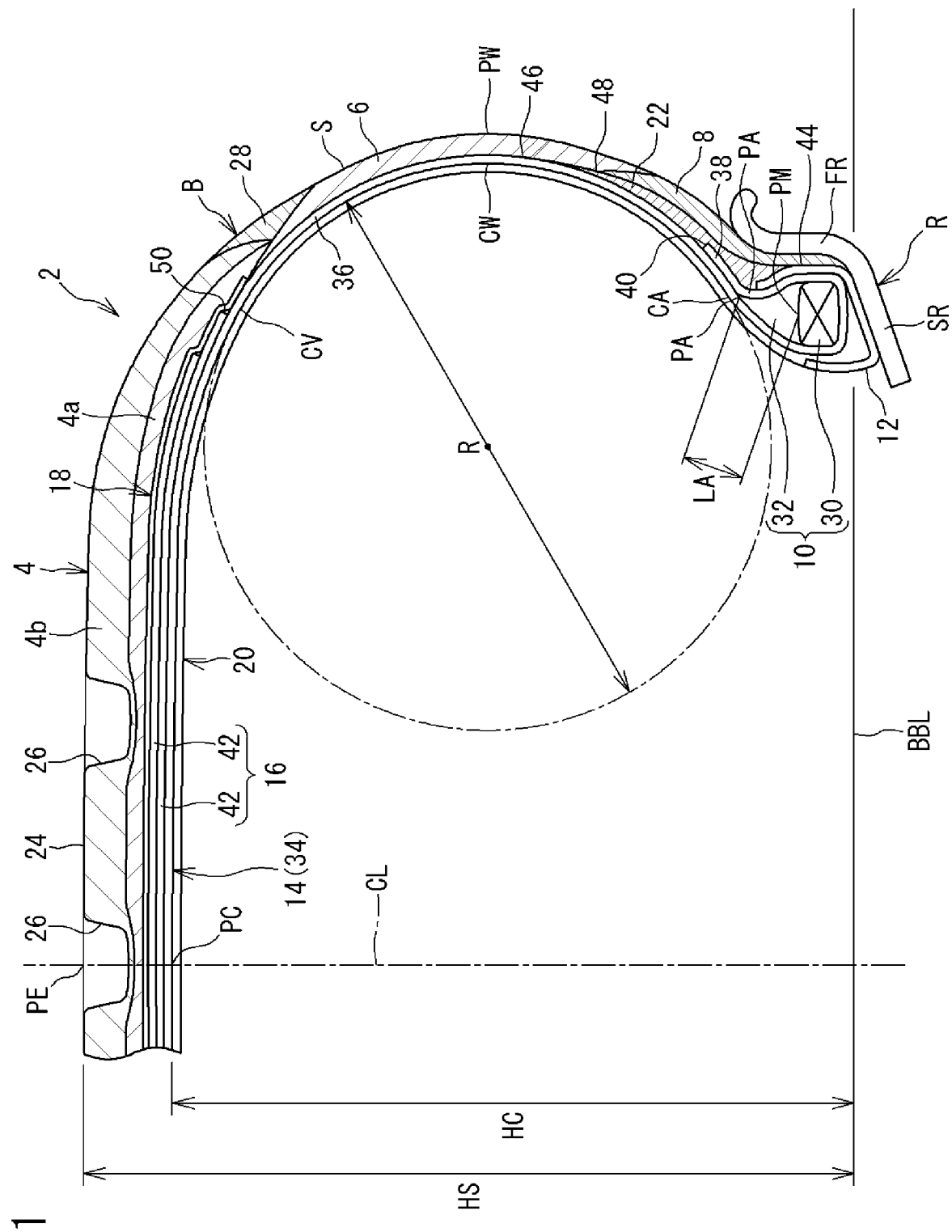
FIG. 1 is a cross-sectional view of a part of a pneumatic tire according to an embodiment of the present invention.

FIG. 1 shows a part of a pneumatic tire 2 (hereinafter, simply referred to as "tire 2") according to an embodiment of the present invention. The tire 2 is mounted to a passenger car.

FIG. 1 shows a part of a cross-section of the tire 2 along a plane including the rotation axis of the tire 2. In FIG. 1, the right-left direction is the axial direction of the tire 2, and the up-down direction is the radial direction of the tire 2. The direction perpendicular to the surface of the sheet of FIG. 1 is the circumferential direction of the tire 2. In FIG. 1, an alternate long and short dash line CL represents the equator plane of the tire 2.

In FIG. 1, the tire 2 is mounted on a rim R. The rim R is a normal rim. The interior of the tire 2 is filled with air, and the internal pressure of the tire 2 is adjusted to a normal internal pressure. No load is applied to the tire 2.

In FIG. 1, a solid line BBL extending in the axial direction is a bead base line. The bead base line BBL is a line that defines the rim diameter (see JATMA or the like) of the rim R (normal rim).

The tire 2 includes a tread 4, a pair of sidewalls 6, a pair of clinches 8, a pair of beads 10, a pair of chafers 12, a carcass 14, a belt 16, a band 18, an inner liner 20, and a pair of rubber reinforcing layers 22.

The outer surface of the tread 4 comes into contact with a road surface. The outer surface of the tread 4 is a tread surface 24. Grooves 26 are formed on the tread 4. In the tire 2, the tread 4 includes a base portion 4a and a cap portion 4b located radially outward of the base portion 4a. The base portion 4a is formed from a crosslinked rubber for which adhesion is taken into consideration. The cap portion 4b is formed from a crosslinked rubber for which abrasion resistance and grip performance are taken into consideration.

In FIG. 1, reference character PE represents the equator of the tire 2. The equator PE is the point of intersection of the equator plane CL and a virtual tread surface obtained on the assumption that the grooves 26 are not present. A double-headed arrow HS represents the distance in the radial direction from the bead base line BBL to the equator PE. The distance HS in the radial direction is the cross-sectional height (see JATMA or the like) of the tire 2.

Each sidewall 6 is connected to an end of the tread 4. The sidewall 6 extends radially inward from the end of the tread 4 along the carcass 14. The sidewall 6 is formed from a crosslinked rubber. The sidewall 6 protects the carcass 14. In the tire 2, a wing 28 is disposed between the sidewall 6 and the tread 4.

Each clinch 8 is located radially inward of the sidewall 6. As shown in FIG. 1, a part of the clinch 8 comes into contact with a flange FR of the rim R. The clinch 8 is formed from a crosslinked rubber for which abrasion resistance is taken into consideration.

In FIG. 1, reference character PW represents an axially outer end of the tire 2. The outer end PW is specified on the basis of a virtual side surface S obtained on the assumption that decorations such as patterns and letters are not present on the outer surfaces of the sidewall 6 and the clinch 8, that is, a side surface S of the tire 2. The distance in the axial direction from one outer end PW to the other outer end PW is the maximum width of the tire 2, that is, the cross-sectional width (see JATMA or the like) of the tire 2. The outer end PW is a position at which the tire 2 has the maximum width.

Each bead 10 is located axially inward of the clinch 8. The bead 10 includes a core 30 and an apex 32. The core 30 extends in the circumferential direction. As shown in FIG. 1, the core 30 has a rectangular cross-sectional shape. The core 30 includes a wire made of steel. The apex 32 is located radially outward of the core 30. In the cross-section of the tire 2 shown in FIG. 1, the apex 32 is tapered outward in the radial direction. In the tire 2, the apex 32 is formed from a crosslinked rubber having high stiffness.

Each chafer 12 is located radially inward of the bead 10. As shown in FIG. 1, at least a part of the chafer 12 comes into contact with a seat SR of the rim R. In the tire 2, the chafer 12 includes a fabric and a rubber with which the fabric is impregnated.

The carcass 14 is located inward of the tread 4, the pair of sidewalls 6, and the pair of clinches 8. The carcass 14 extends from one bead 10 toward the other bead 10. The carcass 14 includes at least one carcass ply 34. In the tire 2, the carcass 14 is composed of the one carcass ply 34.

The carcass ply 34 includes a large number of cords aligned with each other, which are not shown. The carcass cords are covered with a topping rubber. Each carcass cord intersects the equator plane CL. In the tire 2, the angle of each carcass cord relative to the equator plane CL is not less than 70° and not greater than 90°. The carcass 14 of the tire 2 has a radial structure. In the tire 2, a cord formed from an organic fiber is used as each carcass cord. Examples of the organic fiber include nylon fibers, polyester fibers, rayon fibers, and aramid fibers.

In the tire 2, the carcass ply 34 is turned up around each core 30. The carcass ply 34 has: a main body portion 36 that extends on and between one core 30 and the other core 30; and a pair of turned-up portions 38 that are connected to the main body portion 36 and turned up around the respective cores 30 from the inner side toward the outer side in the axial direction. In the tire 2, an end 40 of each turned-up portion 38 is covered with the rubber reinforcing layer 22 from the axially outer side.

The belt 16 is layered over the carcass 14 at the radially inner side of the tread 4. In the tire 2, the belt 16 includes two belt plies 42.

Each belt ply 42 includes a large number of belt cords aligned with each other, which are not shown. Each belt cord is tilted relative to the equator plane CL. The angle of each belt cord relative to the equator plane CL is not less than 10° and not greater than 35°. In the tire 2, the material of the belt cords is steel.

The band 18 is located between the tread 4 and the belt 16 in the radial direction. The band 18 covers the entirety of the belt 16. The band 18 has a jointless structure. The band 18 includes a helically wound band cord, which is not shown. A cord formed from an organic fiber is used as the band cord.

The inner liner 20 is located inward of the carcass 14. The inner liner 20 forms the inner surface of the tire 2. The inner liner 20 is formed from a crosslinked rubber that has an excellent air blocking property. The inner liner 20 maintains the internal pressure of the tire 2.

Each rubber reinforcing layer 22 is formed from a crosslinked rubber. The rubber reinforcing layer 22 is located axially outward of the apex 32. The rubber reinforcing layer 22 is located between the carcass 14 and the clinch 8. As shown in FIG. 1, the rubber reinforcing layer 22 has a maximum thickness at a portion thereof at an outer end PA of the apex 32. The rubber reinforcing layer 22 is tapered inward in the radial direction from the portion having the maximum thickness. An inner end 44 of the rubber reinforcing layer 22 is located near the core 30 in the radial direction. The rubber reinforcing layer 22 is tapered outward in the radial direction from the portion having the maximum thickness. An outer end 46 of the rubber reinforcing layer 22 is located between an outer end 48 of the clinch 8 and a position PW at which a maximum width is obtained, in the radial direction.

In FIG. 1, reference character PM represents the center in the axial direction of the boundary between the core 30 and the apex 32. Reference character PA represents the outer end of the apex 32. A double-headed arrow LA represents the length from the center PM in the axial direction of the boundary to the outer end PA of the apex 32. The length LA is the length of the apex 32.

In the tire 2, the length LA of the apex 32 is not less than 10 mm and not greater than 15 mm. In a conventional tire, the length of each apex is normally set within the range of 30 to 40 mm. The apex 32 of the tire 2 is small. The apex 32 contributes to weight reduction. The apex 32 contributes to reduction of rolling resistance.

In FIG. 1, a point indicated by reference character CV, a point indicated by reference character CW, and a point indicated by reference character CA represent specific positions on the inner surface of the main body portion 36, which is a part of the at least one carcass ply 34. More specifically, in the tire 2, the main body portion 36 is a part of a carcass ply located radially innermost among the at least one carcass ply 34 at the tire equatorial plane CL. The point CV is the point of intersection of the inner surface and a reference line (not shown) that passes through an end 50 of the belt 16 and that extends in the radial direction. The point CV corresponds to the end 50 of the belt 16. The point CW is the point of intersection of the inner surface and a reference line (not shown) that passes through the maximum width position PW and that extends in the axial direction. The point CW corresponds to the maximum width position PW. The point CA is the point of intersection of the inner surface and a reference line (not shown) that passes through the outer end PA of the apex 32 and that extends in the radial direction. The point CA corresponds to the outer end PA of the apex 32.

In the tire 2, the shape of the main body portion 36 located in a zone from a boundary portion between the tread 4 and the sidewall 6, that is, from a buttress B, to the outer end PA of the apex 32 is specified on the basis of the inner surface of the main body portion 36. In the tire 2, the shape of the main body portion 36 is represented by a single circular arc that passes through the point CV, the point CW, and the point CA, and does not pass through the inner surface 52 of the apex 32 extending from the radially outermost point PA of the apex 32 to the boundary between the core 30 and the apex 32. In the present invention, when the distance from the circular arc to the inner surface which is measured along a line that is normal to the circular arc that passes through the point CV, the point CW, and the point CA is within 3% of the length of the circular arc, the shape of the main body portion 36 is determined to be represented by the single circular arc that passes through the point CV, the point CW, and the point CA.

In FIG. 1, an arrow R represents the diameter of the circular arc that represents the shape of the main body portion 36. Reference character PC represents the point of intersection of the inner surface of the carcass 14 and the equator plane CL. The point of intersection PC is the radially outer end of the inner surface. Double-headed arrow HC represents the distance in the radial direction from the bead base line BBL to the radially outer end PC. In the present invention, the distance HC is the cross-sectional height of the carcass 14.

In the tire 2, the apexes 32 smaller than those in the conventional tire are used, and the rubber reinforcing layers 22 are provided between the carcass 14 and the clinches 8. In a state where the tire 2 is mounted on the normal rim and the internal pressure of the tire 2 is adjusted to the normal internal pressure, the shape of the main body portion 36 located in the zone from the buttress B to the outer end PA of the apex 32 is represented by the single circular arc, and the diameter R of the circular arc is not less than 75% and not greater than 90% of the cross-sectional height HC of the carcass 14.

In the tire 2, the main body portion 36 located in the zone from the buttress B to the outer end PA of the apex 32 particularly contributes to reduction of the volume of a bead 10 portion. In the tire 2, even though the rubber reinforcing layers 22 are used, reduction of weight and rolling resistance is achieved. Furthermore, since each rubber reinforcing layer 22 supports the main body portion 36 in the bead 10 portion, reduction of in-plane torsional stiffness is inhibited. In the tire 2, required stiffness is ensured. In the tire 2, good steering stability is maintained. The tire 2 can have a reduced weight and reduced rolling resistance while ensuring desired stiffness.

As described above, in the tire 2, the shape of the main body portion 36 located in the zone from the buttress B to the outer end PA of the apex 32 is represented by the single circular arc. Thus, the entirety of a portion from the sidewall 6 to the clinch 8, that is, the entirety of a side portion, bends. Local concentration of distortion on the side portion is inhibited, and thus the durability of the tire 2 is also improved.

Figure 2:
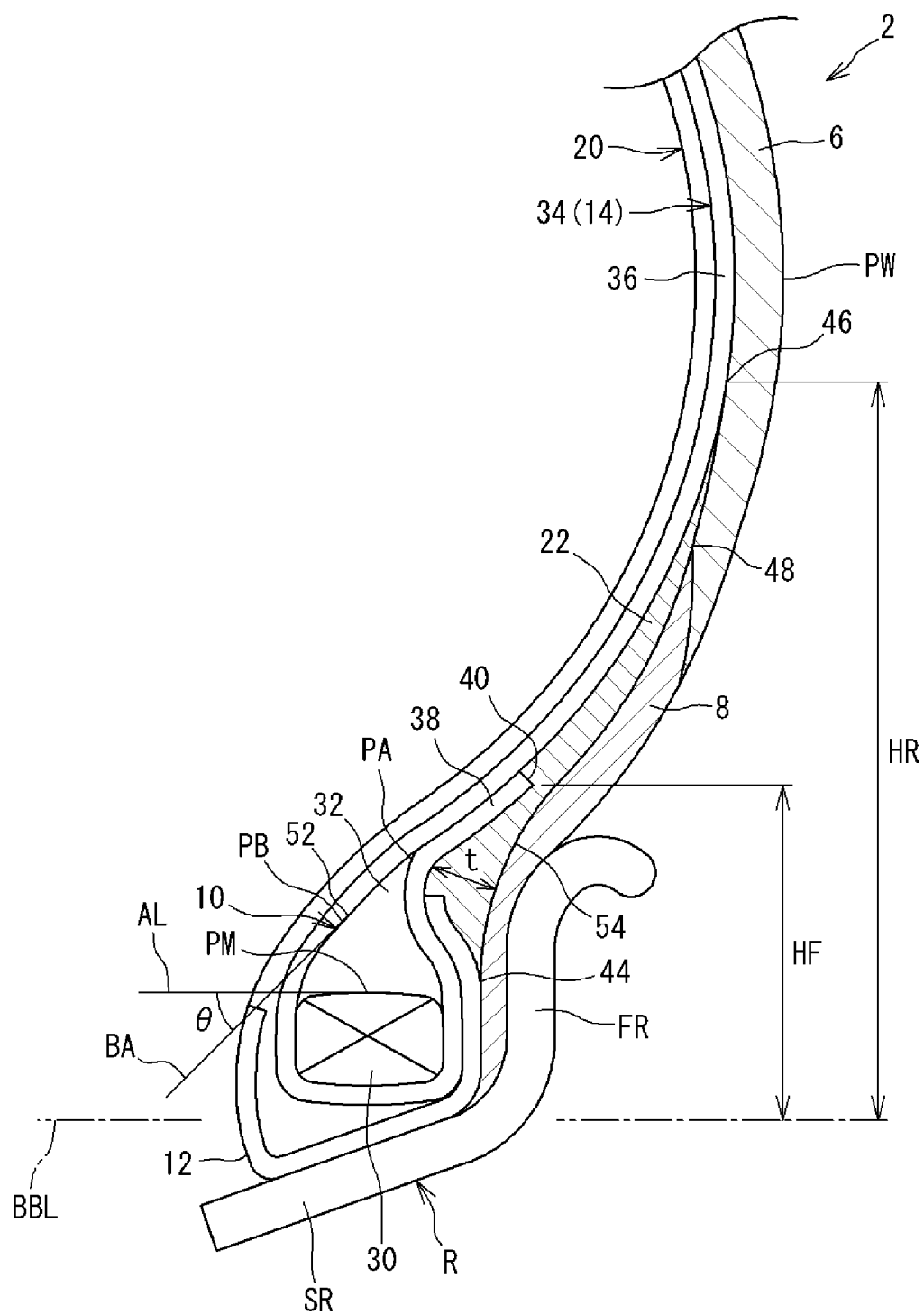
FIG. 2 is a cross-sectional view of a part of the tire in FIG. 1.

FIG. 2 shows a part of the cross-section of the tire 2 shown in FIG. 1. In FIG. 2, a bead 10 portion of the tire 2 is shown. In FIG. 2, the right-left direction is the axial direction of the tire 2, and the up-down direction is the radial direction of the tire 2. The direction perpendicular to the surface of the sheet of FIG. 2 is the circumferential direction of the tire 2.

In FIG. 2, reference character PB represents the position on an inner surface 52 of the apex 32 corresponding to the position at which the height in the radial direction of the apex 32 is half. A solid line BA is a straight line that passes through the position PB and the outer end PA of the apex 32. The solid line BA is tilted relative to the axial direction.

At the bead 10 portion, the main body portion 36 of the carcass ply 34 extends from the core 30 toward the outer end PA of the apex 32 along the inner surface 52 of the apex 32. As shown in FIG. 2, in the tire 2, the main body portion 36 is tilted relative to the axial direction. In the present invention, the direction in which the main body portion 36, which extends along the inner surface 52 of the apex 32, is tilted is specified by the direction in which the aforementioned solid line BA is tilted.

In FIG. 2, a solid line AL is a straight line that passes through the center PM in the axial direction of the boundary between the core 30 and the apex 32 and extends in the axial direction. An angle represented by reference character θ is the angle of the solid line BA relative to the solid line AL. In the present invention, at the bead 10 portion, the angle of the main body portion 36, which extends along the inner surface 52 of the apex 32, relative to the axial direction is represented by the angle θ.

In the present invention, the aforementioned angle θ is measured in a state where the tire 2 is mounted on the rim R (normal rim), the internal pressure of the tire 2 is adjusted to 10% of the normal internal pressure, and no load is applied to the tire 2. Although not shown, in production of the tire 2, the tire 2 is formed by pressing a raw cover (uncrosslinked tire 2) against the cavity face of a mold. The outer surface of the tire 2 in the aforementioned state corresponds to the outer surface of the tire 2 represented by the cavity face of the mold.

As described above, in the tire 2, the main body portion 36, which extends along the inner surface 52 of the apex 32, is titled relative to the axial direction. In particular, in the tire 2, the angle θ of the main body portion 36 relative to the axial direction at the bead 10 portion is not less than 45° and preferably not greater than 50°. When the angle θ is set so as to be not less than 45°, the main body portion 36 contributes to inhibition of reduction of in-plane torsional stiffness. In the tire 2, required stiffness is ensured. When the angle θ is set so as to be not greater than 50°, the main body portion 36 contributes to reduction of the volume of the bead 10 portion. The weight and the rolling resistance of the tire 2 are reduced.

Furthermore, in the tire 2, setting the angle θ of the main body portion 36 relative to the axial direction to be within the range of 45° to 50° contributes to forming the main body portion 36 located in the zone from the buttress B to the outer end PA of the apex 32 such that the shape of the main body portion 36 draws a circular arc in the tire 2 in the normal state. The main body portion 36, in the zone, having a shape represented by the circular arc contributes to reduction of the volume of the bead 10 portion and inhibition of reduction of in-plane torsional stiffness as described above. The tire 2 can have a reduced weight and reduced rolling resistance while ensuring desired stiffness.

As described above, in the tire 2, each apex 32 is formed from a crosslinked rubber having high stiffness. In the tire 2, from the standpoint of ensuring desired stiffness, a complex elastic modulus E*a of the apex 32 is preferably not less than 70 MPa and preferably not greater than 130 MPa. From the standpoint of inhibition of heat generation, a loss tangent LTa of the apex 32 is preferably not greater than 0.18.

In the present invention, the complex elastic moduli and loss tangents (also referred to as tanδ) of the components of the tire 2 such as the apex 32 are measured according to the standards of JIS K6394 using a viscoelasticity spectrometer under the following conditions.

Initial strain: 10%
Amplitude: ±1%
Frequency: 10 Hz
Deformation mode: tension
Measurement temperature: 70° C.

In the tire 2, each clinch 8 is formed from a flexible crosslinked rubber. From the standpoint of ensuring desired stiffness, a complex elastic modulus E*c of the clinch 8 is preferably not less than 7 MPa. From the standpoint of ensuring flexibility and maintaining good durability, the complex elastic modulus E*c of the clinch 8 is preferably not greater than 13 MPa. From the standpoint of inhibition of heat generation, a loss tangent LTc of the clinch 8 is preferably not greater than 0.08.

In the tire 2, the rubber reinforcing layer 22, together with the small apex 32, contributes to the stiffness of the bead 10 portion. From this standpoint, a complex elastic modulus E*r of the rubber reinforcing layer 22 is preferably not less than 60 MPa. From the standpoint of ensuring flexibility and maintaining good durability, the complex elastic modulus E*r of the rubber reinforcing layer 22 is preferably not greater than 100 MPa. From the standpoint of inhibition of heat generation, a loss tangent LTr of the rubber reinforcing layer 22 is preferably not greater than 0.16.

In the tire 2, the complex elastic modulus E*r of the rubber reinforcing layer 22 is preferably equal to the complex elastic modulus E*a of the apex 32, or lower than the complex elastic modulus E*a of the apex 32. In the tire 2, the rubber reinforcing layer 22 achieves improvement of in-plane torsional stiffness, and the apex 32 contributes to the stiffness of the bead 10 portion. In the tire 2, sufficient stiffness is ensured, and thus good steering stability is obtained. From this standpoint, the complex elastic modulus E*r of the rubber reinforcing layer 22 is more preferably lower than the complex elastic modulus E*a of the apex 32. Specifically, the difference (E*a−E*r) between the complex elastic modulus E*a of the apex 32 and the complex elastic modulus E*r of the rubber reinforcing layer 22 is preferably not less than 0 MPa and more preferably not less than 10 MPa. From the standpoint that the difference between the stiffness of the rubber reinforcing layers 22 and the stiffness of the apex 32 is reduced and good durability is maintained, the difference (E*a−E*r) is preferably not greater than 50 MPa.

In the tire 2, a loss tangent LTr of the rubber reinforcing layer 22 is preferably equal to the loss tangent LTa of the apex 32, or lower than the loss tangent LTa of the apex 32. Since the rubber reinforcing layer 22 is used, heat generation due to deformation is inhibited in the bead 10 portion. In the tire 2, the rubber reinforcing layer 22 contributes to reduction of rolling resistance. From this standpoint, the loss tangent LTr of the rubber reinforcing layer 22 is more preferably lower than the loss tangent LTa of the apex 32. Specifically, the difference (LTa−LTr) between the loss tangent LTa of the apex 32 and the loss tangent LTr of the rubber reinforcing layer 22 is preferably not less than 0.00 and more preferably not less than 0.05. Since it is more preferable that the loss tangent LTr of the rubber reinforcing layer 22 is lower, it is more preferable that the difference (LTa−LTr) is greater, from the standpoint of reduction of rolling resistance.

In the tire 2, from the standpoint that reduction of rolling resistance is achieved while desired stiffness is ensured, more preferably, the loss tangent LTr of the rubber reinforcing layer 22 is equal to the loss tangent LTa of the apex 32, or lower than the loss tangent LTa of the apex 32, and the complex elastic modulus E*r of the rubber reinforcing layer 22 is equal to the complex elastic modulus E*a of the apex 32, or lower than the complex elastic modulus E*a of the apex 32. In the tire 2, further preferably, the loss tangent LTr of the rubber reinforcing layer 22 is lower than the loss tangent LTa of the apex 32, and the complex elastic modulus E*r of the rubber reinforcing layer 22 is lower than the complex elastic modulus E*a of the apex 32.

In the tire 2, the complex elastic modulus E*r of the rubber reinforcing layer 22 is higher than the complex elastic modulus E*c of the clinch 8. The rubber reinforcing layer 22 is harder than the clinch 8. The rubber reinforcing layer 22 contributes to the stiffness of the bead 10 portion. As shown in FIG. 2, the rubber reinforcing layer 22 supports the main body portion 36 from the radially inner side between the core 30 and the maximum width position PW. In the tire 2, the rubber reinforcing layer 22 contributes to ensuring desired in-plane torsional stiffness. From this standpoint, in the tire 2, the difference (E*r−E*c) between the complex elastic modulus E*r of the rubber reinforcing layer 22 and the complex elastic modulus E*c of the clinch 8 is preferably not less than 50 MPa. From the standpoint that the difference between the stiffness of the rubber reinforcing layer 22 and the stiffness of the clinch 8 is reduced and good durability is maintained, the difference (E*r−E*c) is preferably not greater than 90 MPa.

In the tire 2, the clinch 8 is located axially outward of the rubber reinforcing layer 22. The clinch 8 is located at a portion whose degree of deformation is higher than that of the rubber reinforcing layer 22. In the tire 2, the loss tangent LTc of the clinch 8 is preferably lower than the loss tangent LTr of the rubber reinforcing layer 22. Accordingly, heat generation is effectively inhibited. In the tire 2, the clinch 8 contributes to reduction of rolling resistance. From this standpoint, the difference (LTr−LTc) between the loss tangent LTr of the rubber reinforcing layer 22 and the loss tangent LTc of the clinch 8 is preferably not less than 0.01 and more preferably not less than 0.03. Since it is more preferable that the loss tangent LTc of the clinch 8 is lower, it is more preferable that the difference (LTr−LTc) is greater, from the standpoint of reduction of rolling resistance.

In the tire 2, from the standpoint that reduction of rolling resistance is achieved while desired stiffness is ensured, preferably, the complex elastic modulus E*r of the rubber reinforcing layer 22 is higher than the complex elastic modulus E*c of the clinch 8, and the loss tangent LTc of the clinch 8 is lower than the loss tangent LTr of the rubber reinforcing layer 22.

In the tire 2, the complex elastic modulus E*c of the clinch 8 is lower than the complex elastic modulus E*a of the apex 32. The clinch 8 is more flexible than the apex 32. The clinch 8 contributes to forming the main body portion 36 located in the zone from the buttress B to the outer end PA of the apex 32 such that the shape of the main body portion 36 draws a circular arc in the tire 2 in the normal state. The tire 2 can have a reduced weight and reduced rolling resistance while ensuring desired stiffness. From this standpoint, the difference (E*a−E*c) between the complex elastic modulus E*a of the apex 32 and the complex elastic modulus E*c of the clinch 8 is preferably not less than 60 MPa. From the standpoint that the difference between the stiffness of the apex 32 and the stiffness of the clinch 8 is reduced and good durability is maintained, the difference (E*a−E*c) is preferably not greater than 100 MPa.

In the tire 2, the loss tangent LTc of the clinch 8 is lower than the loss tangent LTa of the apex 32. In the clinch 8, heat generation due to deformation is inhibited as compared to that in the apex 32. The clinch 8 contributes to reduction of rolling resistance. From this standpoint, the difference (LTa−LTc) between the loss tangent LTa of the apex 32 and the loss tangent LTc of the clinch 8 is preferably not less than 0.05. Since it is more preferable that the loss tangent LTc of the clinch 8 is lower, it is more preferable that the difference (LTa−LTc) is greater, from the standpoint of reduction of rolling resistance.

In FIG. 2, a double-headed arrow HR represents the distance in the radial direction from the bead base line BBL to the outer end 46 of the rubber reinforcing layer 22. A double-headed arrow HF represents the distance in the radial direction from the bead base line BBL to the end 40 of the turned-up portion 38.

In the tire 2, the distance HR in the radial direction from the bead base line BBL to the outer end 46 of the rubber reinforcing layer 22 is preferably not less than 35% and preferably not greater than 45% of the cross-sectional height HS of the tire 2. When the ratio of the distance HR in the radial direction relative to the cross-sectional height HS is set so as to be not less than 35%, the rubber reinforcing layer 22 effectively contributes to ensuring desired stiffness. When this ratio is set so as to be not greater than 45%, the volume of the rubber reinforcing layer 22 is appropriately maintained. The rubber reinforcing layer 22 contributes to reduction of weight and rolling resistance.

In the tire 2, the distance HF in the radial direction from the bead base line BBL to the end 40 of the turned-up portion 38 is preferably not less than 20 mm and preferably not greater than 30 mm. When the distance HF in the radial direction is set so as to be not less than 20 mm, the turned-up portion 38 effectively contributes to ensuring desired stiffness. When the distance HF in the radial direction is set so as to be not greater than 30 mm, influence of the turned-up portion 38 on weight is inhibited. Furthermore, damage starting from the end 40 of the turned-up portion 38 is prevented, and thus good durability is maintained.

As described above, in the tire 2, the rubber reinforcing layer 22 has the maximum thickness at the portion thereof at the outer end PA of the apex 32. In FIG. 2, a double-headed arrow t represents the maximum thickness of the rubber reinforcing layer 22. This maximum thickness is represented by the maximum value of the thickness measured along a line that is normal to an outer surface 54 of the rubber reinforcing layer 22.

In the tire 2, the maximum thickness t of the rubber reinforcing layer 22 is preferably not less than 2 mm and preferably not greater than 4 mm. When the maximum thickness t is set so as to be not less than 2 mm, the rubber reinforcing layer 22 effectively contributes to ensuring desired stiffness. When the maximum thickness t is set so as to be not greater than 4 mm, the volume of the rubber reinforcing layer 22 is appropriately maintained. The rubber reinforcing layer 22 contributes to reduction of weight and rolling resistance.

As described above, in the tire 2, the carcass ply 34 includes a large number of carcass cords aligned with each other. In the tire 2, the fineness of each carcass cord is preferably not less than 1500 dtex and preferably not greater than 1700 dtex. When the fineness of each carcass cord is set so as to be not less than 1500 dtex, the carcass ply 34 effectively contributes to ensuring desired stiffness. When this fineness is set so as to be not greater than 1700 dtex, influence of the carcass ply 34 on weight and rolling resistance is inhibited.

As is obvious from the above description, according to the present invention, the pneumatic tire 2 that has a reduced weight and reduced rolling resistance while ensuring desired stiffness is obtained.

The embodiments disclosed above are merely illustrative in all aspects and are not restrictive. The technical scope of the present invention is not limited to the above-described embodiments, and all changes which come within the range of equivalency of the configurations recited in the claims are therefore intended to be included therein.

EXAMPLES

The following will describe the present invention in further detail by means of examples, etc., but the present invention is not limited to these examples.

Example 1

A passenger car pneumatic tire (tire size=205/55R16) having the basic structure shown in FIG. 1 and having the specifications shown in Table 1 below was obtained.

In Example 1, the ratio (R/HC) of the diameter R of the circular arc, which represents the shape of each main body portion, relative to the cross-sectional height HC of the carcass was 80%. The length LA of each apex was 10 mm. The ratio (HR/HS) of the distance HR in the radial direction from the bead base line to the outer end of each rubber reinforcing layer relative to the cross-sectional height HS of the tire was 40%. The maximum thickness t of the rubber reinforcing layer was 3 mm. The distance HF in the radial direction from the bead base line to the end of each turned-up portion was 25 mm. The fineness of each carcass cord was 1100 dtex.

In Example 1, the loss tangent LTa of the apex was 0.15, and the complex elastic modulus E*a of the apex was 100 MPa. The loss tangent LTc of each clinch was 0.05, and the complex elastic modulus E*c of each clinch was 10 MPa. The loss tangent LTr of the rubber reinforcing layer was 0.10, and the complex elastic modulus E*r of the rubber reinforcing layer was 70 MPa.

Comparative Example 1

A tire of Comparative Example 1 was obtained in the same manner as Example 1, except that no rubber reinforcing layer was provided and the ratio (R/HC) and the length LA were set as shown in Table 1 below. The tire of Comparative Example 1 is a conventional tire.

Examples 2 and 3 and Comparative Examples 2 and 3

Tires of Examples 2 and 3 and Comparative Examples 2 and 3 were obtained in the same manner as Example 1, except that the ratio (R/HC) was set as shown in Table 1 below.

Examples 4 to 6

Tires of Examples 4 to 6 were obtained in the same manner as Example 1, except that the complex elastic modulus E*r of the apex was set as shown in Table 2 below.

Example 7

A tire of Example 7 was obtained in the same manner as Example 1, except that the loss tangent LTa of the apex was set as shown in Table 2 below.

Example 8

A tire of Example 8 was obtained in the same manner as Example 1, except that the loss tangent LTc of the clinch was set as shown in Table 2 below.

Example 9

A tire of Example 9 was obtained in the same manner as Example 1, except that the fineness of each carcass cord was set as shown in Table 2 below.

[Weight]

The weight of each sample tire was measured. The results are shown as indexes in Tables 1 and 2 below. The lower the value is, the lower the weight is.

[Rolling Resistance]

Each sample tire was fitted onto a normal rim and the internal pressure thereof was adjusted to 210 kPa. Rolling resistance (RR) was measured by using a rolling resistance testing machine. The load was set to 4.8 kN. The speed was set to 80 km/h. The results are shown as indexes in Table 1 and Table 2 below. The lower the value is, the lower the rolling resistance is. In the evaluation for rolling resistance, an index of 95 or less is set as a target.

[In-Plane Torsional Stiffness]

Each sample tire was fitted onto a normal rim and the internal pressure thereof was adjusted to 250 kPa. Reaction force was measured by using an in-plane torsional stiffness testing machine when the tread surface of the tire was fixed and the rim was rotated by 0.8° in the circumferential direction. The results are shown as indexes in Table 1 and Table 2 below. The higher the value is, the higher the in-plane torsional stiffness is. In the evaluation for in-plane torsional stiffness, an index of 95 or greater is set as a target.

TABLE 1

|  |  | Comparative Example 1 | Comparative Example 2 | Example 2 | Example 1 | Example 3 | Comparative Example 3 |
|---|---|---|---|---|---|---|---|
|  | R/HC [%] | 70 | 165 | 90 | 80 | 75 | 70 |
|  | LA [mm] | 35 | 10 | 10 | 10 | 10 | 10 |
|  | HR/HS [%] | — | 40 | 40 | 40 | 40 | 40 |
|  | t [mm] | — | 3 | 3 | 3 | 3 | 3 |
|  | HF [mm] | 25 | 25 | 25 | 25 | 25 | 25 |
| Apex | E*a [MPa] | 100 | 100 | 100 | 100 | 100 | 100 |
|  | LTa [—] | 0.15 | 0.15 | 0.15 | 0.15 | 0.15 | 0.15 |
| Clinch | E*c [MPa] | 10 | 10 | 10 | 10 | 10 | 10 |
|  | LTc [—] | 0.05 | 0.05 | 0.05 | 0.05 | 0.05 | 0.05 |
| Rubber reinforcing layer | E*r [MPa] | — | 70 | 70 | 70 | 70 | 70 |
|  | LTr [—] | — | 0.10 | 0.10 | 0.10 | 0.10 | 0.10 |
| Carcass cord | Fineness [dtex] | 1100 | 1100 | 1100 | 1100 | 1100 | 1100 |
|  | Weight | 100 | 99 | 97 | 96 | 96 | 95 |
|  | RR | 100 | 97 | 95 | 94 | 94 | 93 |
|  | In-plane torsional stiffness | 100 | 103 | 101 | 100 | 100 | 93 |

TABLE 2

|  |  | Example 4 | Example 5 | Example 6 | Example 7 | Example 8 | Example 9 |
|---|---|---|---|---|---|---|---|
|  | R/HC [%] | 80 | 80 | 80 | 80 | 80 | 80 |
|  | LA [mm] | 10 | 10 | 10 | 10 | 10 | 10 |
|  | HR/HS [%] | 40 | 40 | 40 | 40 | 40 | 40 |
|  | t [mm] | 3 | 3 | 3 | 3 | 3 | 3 |
|  | HF [mm] | 25 | 25 | 25 | 25 | 25 | 25 |
| Apex | E*a [MPa] | 50 | 70 | 80 | 100 | 100 | 100 |
|  | LTa [—] | 0.15 | 0.15 | 0.15 | 0.20 | 0.15 | 0.15 |
| Clinch | E*c [MPa] | 10 | 10 | 10 | 10 | 10 | 10 |
|  | LTc [—] | 0.05 | 0.05 | 0.05 | 0.05 | 0.10 | 0.05 |
| Rubber reinforcing layer | E*r [MPa] | 70 | 70 | 70 | 70 | 70 | 70 |
|  | LTr [—] | 0.10 | 0.10 | 0.10 | 0.10 | 0.10 | 0.10 |
| Carcass cord | Fineness [dtex] | 1100 | 1100 | 1100 | 1100 | 1100 | 1670 |
|  | Weight | 96 | 96 | 96 | 96 | 96 | 98 |
|  | RR | 94 | 94 | 94 | 95 | 95 | 95 |
|  | In-plane torsional stiffness | 95 | 97 | 99 | 100 | 98 | 105 |

As shown in Table 1 and Table 2, the examples are highly rated, as compared to the comparative examples. In particular, in the examples, reduction of weight and rolling resistance is achieved while desired stiffness is ensured. From the evaluation results, advantages of the present invention are clear.

The above-described technology to achieve reduction of weight and rolling resistance while ensuring desired stiffness can also be applied to various tires.

What is clamed is:

1. A pneumatic tire comprising:
a tread;
a pair of sidewalls each connected to a respective axial end of the tread;
a pair of clinches each located radially inward of a respective one of the pair of sidewalls;
a pair of beads each located axially inward of a respective one of the pair of clinches, each bead having a core extending in a circumferential direction and an apex located radially outward of the core and tapering radially outward to an outermost point;
a carcass extending from one of the pair of beads to the other at an inner side of the tread and the pair of sidewalls
a belt layered over the carcass at the radially inner side of the tread and
a pair of rubber reinforcing layers each located between the carcass and a respective one of the pair of clinches, wherein
the carcass includes at least one carcass ply, a carcass ply located radially innermost among the at least one carcass ply at a tire equatorial plane having a main body portion that extends on and between one of the cores and the other and a pair of turned-up portions that are connected to the main body portion and turned up around the cores from an inner side toward an outer side in an axial direction,
in each bead a length from a center in the axial direction of a boundary between the core and the apex to the radially outermost point of the apex is not less than 10 mm and not greater than 15 mm, and
in a state where the tire is mounted on a normal rim and an internal pressure of the tire is adjusted to a normal internal pressure, on each side of the tire an inner surface cross-sectional shape of the main body portion passing through points CV, CW, and CA from outside to inside in the radial direction is formed by a single circular arc, and a diameter of the circular arc is not less than 75% and not greater than 90% of a cross-sectional height of the carcass, the point CV being the point of intersection of the inner surface and a reference line that passes through the respective end of the belt and extends in the radial direction, the point CW being the point of intersection of the inner surface and a reference line that passes through the respective tire maximum width position and extends in the axial direction, the point CA being the point of intersection of the inner surface and a reference line that passes through the radially outermost point of the respective apex and extends in the radial direction, and the single circular arc not passing through an inner surface of the apex extending from the radially outermost point to the boundary between the core and the apex.

2. The pneumatic tire according to claim 1, wherein
in a state where the tire is mounted on the normal rim and the internal pressure of the tire is adjusted to 10% of the normal internal pressure,
in each bead the main body portion extends along the inner surface of the apex at an inclination relative to the axial direction, and an angle of the main body portion relative to the axial direction is not less than 45° and not greater than 50°, the angle being measured between an axial line passing through the center in the axial direction of the boundary between the core and the apex and a straight line passing through both the radially outermost point of the apex and the position on the inner surface of the apex having a radial height equal to half the radial height of the apex from the center in the axial direction of the boundary between the core and the apex to the radially outermost point of the apex.

3. The pneumatic tire according to claim 1, wherein a distance in a radial direction from a bead base line to an outermost end of each rubber reinforcing layer is not less than 35% and not greater than 45% of a cross-sectional height of the tire.

4. The pneumatic tire according to claim 1, wherein a maximum thickness of each rubber reinforcing layer is not less than 2 mm and not greater than 4 mm.

5. The pneumatic tire according to claim 4, wherein each of the rubber reinforcing layers has the maximum thickness along a line normal to an outer surface of the rubber reinforcing layer and passing through the radially outermost point of the respective apex.

6. The pneumatic tire according to claim 1, wherein each apex is formed from a crosslinked rubber and the complex elastic modulus E*a of each apex is not less than 70 MPa and not greater than 130 MPa, and the loss tangent LTa of each apex is not greater than 0.18.

7. The pneumatic tire according to claim 1, wherein each clinch is formed from a crosslinked rubber and the complex elastic modulus E*c of each clinch is not less than 7 MPa and not greater than 13 MPa, and the loss tangent LTc of each clinch is not greater than 0.08.

8. The pneumatic tire according to claim 1, wherein a distance in a radial direction from a bead base line to an outermost end of each turned-up portion is not less than 20 mm and not greater than 30 mm.

9. The pneumatic tire according to claim 1, wherein the carcass ply includes a plurality of carcass cords aligned with each other, and a fineness of each carcass cord is not less than 1500 dtex and not greater than 1700 dtex.

10. The pneumatic tire according to claim 1, wherein each clinch is formed from a crosslinked rubber and the complex elastic modulus E*r of each rubber reinforcing layer is higher than the complex elastic modulus E*c of each clinch.

11. The pneumatic tire according to claim 10, wherein the complex elastic modulus E*r of each rubber reinforcing layer is equal to the complex elastic modulus E*a of each apex, or lower than the complex elastic modulus E*a of each apex.

12. The pneumatic tire according to claim 1, wherein each clinch is formed from a crosslinked rubber and the loss tangent LTc of each clinch is lower than the loss tangent LTr of each rubber reinforcing layer.

13. The pneumatic tire according to claim 12, wherein the loss tangent LTr of each rubber reinforcing layer is equal to the loss tangent LTa of each apex, or lower than the loss tangent LTa of each apex.

14. The pneumatic tire according to claim 1, wherein each apex is formed from a crosslinked rubber and the complex elastic modulus E*r of each rubber reinforcing layer is equal to the complex elastic modulus E*a of each apex, or lower than the complex elastic modulus E*a of each apex.

15. The pneumatic tire according to claim 1, wherein each apex is formed from a crosslinked rubber and the loss tangent LTr of each rubber reinforcing layer is equal to the loss tangent LTa of each apex, or lower than the loss tangent LTa of each apex.

* * * * *